United States Patent [19]
Murata et al.

[11] Patent Number: 5,729,976
[45] Date of Patent: Mar. 24, 1998

[54] ONE-WAY CLUTCH MECHANISM OF TORQUE CONVERTER

[75] Inventors: Kiyohito Murata; Hiroyuki Shioiri; Shogo Matsumoto, all of Susono, Japan

[73] Assignee: Toyota Jidosha Kabushiki Kaisha, Toyota, Japan

[21] Appl. No.: 660,593

[22] Filed: Jun. 11, 1996

[30] Foreign Application Priority Data

Jun. 26, 1995 [JP] Japan ................. 7-159137

[51] Int. Cl.⁶ ................................. F16D 33/00
[52] U.S. Cl. ................................. 60/345
[58] Field of Search ............... 60/345; 192/3.34, 192/54.5, 93 A

[56] References Cited

U.S. PATENT DOCUMENTS

| | | | |
|---|---|---|---|
| 3,461,670 | 8/1969 | Waclawek | 60/343 |
| 3,724,208 | 4/1973 | Welch et al. | 60/343 |
| 4,441,315 | 4/1984 | Bochot | 60/345 |
| 4,462,272 | 7/1984 | Roper | 192/54.5 |
| 5,168,702 | 12/1992 | Sakakibara et al. | 60/345 |
| 5,638,933 | 6/1997 | Matsumoto et al. | 192/54.5 |

FOREIGN PATENT DOCUMENTS 5-45306  6/1993  Japan.

*Primary Examiner*—Sheldon Richter
*Attorney, Agent, or Firm*—Oblon, Spivak, McClelland, Maier & Neustadt, P.C.

[57] ABSTRACT

A one-way clutch mechanism suited to shorten its axial dimension and to prevent the production of a shock noise, in which a side clutch member (20 in FIG. 3) is interposed between a stator side member (18) disposed unitarily with a stator and a stationary-shaft side member (22) disposed unitarily with a stationary shaft, and in which the surfaces of the stator side member (18) and the side clutch member (20) confronting each other are respectively formed with oblique planes (18a, 20a), wherein only when the stator has received a turning force of specified direction from a fluid stream, the stator side member (18) and the side clutch member (20) are brought away from each other into the operational connection of the stator side member (18) and the stationary-shaft side member (22) by the cooperation of the oblique planes (18a, 20a).

3 Claims, 7 Drawing Sheets

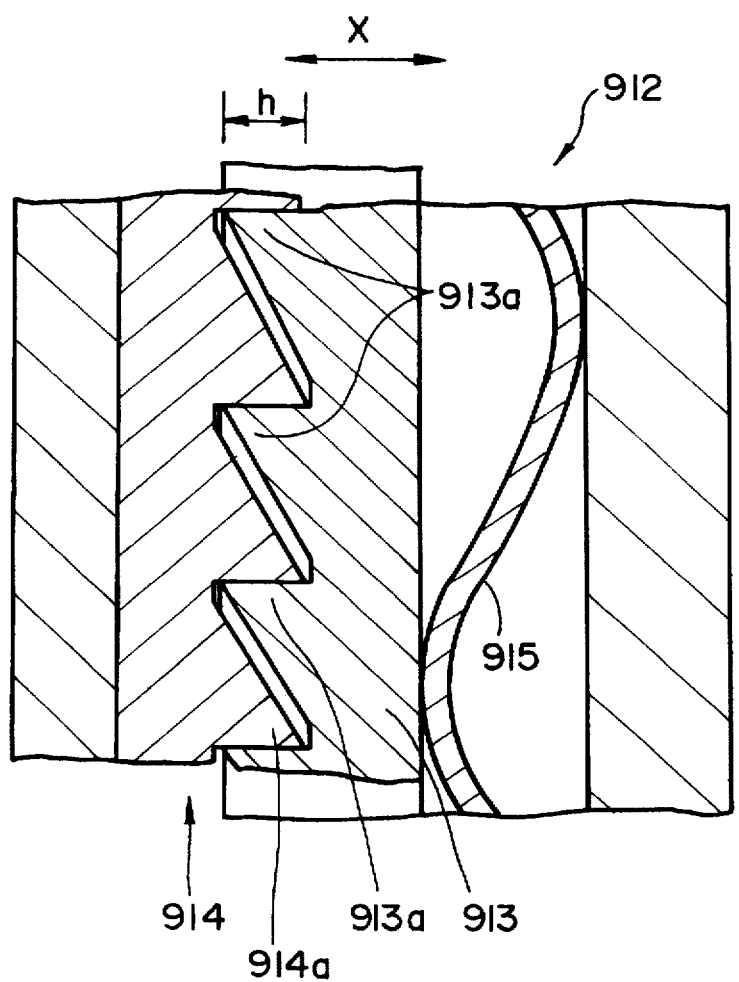

ONE-WAY CLUTCH MECHANISM OF TORQUE CONVERTER

BACKGROUND OF THE INVENTION

1. Field of the Invention

The present invention relates to the one-way clutch mechanism of a torque converter.

2. Description of the Prior Art

Heretofore, there has been known the one-way clutch mechanism of a torque converter having a pump impeller which generates a fluid stream, a turbine runner which is rotated by the fluid stream, a stationary shaft, a stator which is arranged between the pump impeller and the turbine runner so as to receive a turning force from the fluid stream, and a one-way clutch for connecting the stator to the stationary shaft when the stator has received the turning force of specified direction from the fluid stream.

What are called the "sprag type" and the "roller type", are extensively adopted as the constructions of such one-way clutches.

Each of the one-way clutches of these types, however, has the problem that parts undergo high stresses (surface pressures) due to a structure wherein the parts lie in line contact. Therefore, the one-way clutch necessitates a certain magnitude of width and inevitably increases in its axial dimension in order that the surface pressures acted on the parts of the line contact may be kept within an allowable range.

Meanwhile, a one-way clutch constructed as shown in FIG. 9 of the accompanying drawings is disclosed in, for example, the official gazette of Japanese Utility Model Registration Application Laid-open No. 45306/1993.

The one-way clutch 912 has an outer race 913, an inner race 914 and a wave spring 915. The outer race 913 is unrotatably fixed on the inner circumferential side of a stator (not shown), and has a plurality of first teeth 913a. The inner race 914 is capable of coming away from the outer race 913, and has a plurality of second teeth 914a which mesh with the first teeth 913a. The wave spring 915 urges either one of the outer race 913 and inner race 914 onto the other side.

With the one-way clutch 912 disclosed in the official gazette of Japanese Utility Model Registration Application Laid-open No. 45306/1993, each time the inner race 914 rotates one tooth in the idle mode of the clutch 912 (in other words, during the release of the clutch 912), the outer race 913 is displaced (shifted) an amount corresponding to the height h of each of the first tooth 913a and second tooth 914a, in the axial direction X of the clutch 912.

Therefore, the wave spring 915 needs to have a stroke margin allowing the displacement, and the axial dimension of the clutch 912 cannot be shortened much.

Another problem is that a shock noise is produced when the first teeth 913a and second teeth 914a lying in mesh in the idle mode are disengaged from each other and are restored into the meshing state again.

SUMMARY OF THE INVENTION

The present invention has been made in view of the problems of the prior art as stated above, and has for its object to provide the one-way clutch mechanism of a torque converter which can more shorten the axial dimension of a one-way clutch and which does not produce a shock noise in the idle mode thereof.

The present invention has achieved the above object by adopting the structure defined by claims 1 to 3.

In operation, when the stator has received the turning force of the specified direction from the fluid stream, an axial force (a component force in the axial direction of the torque converter) is generated by the cooperation of the oblique planes which are respectively formed in the surfaces of the stator side member and side clutch member confronting each other. As a result, the stator side member and the side clutch member come away from each other till the engagement of the side clutch member with the stationary-shaft side member. Since the side clutch member is united with the stator side member in the rotating direction thereof, the aforementioned engagement eventually leads to the clutch engagement between the stator side member and the stationary-shaft side member (that is, to the application of the one-way clutch means).

On the other hand, in the case where the stator has received the turning force in the direction reverse to said specified direction from the fluid stream, the axial force (the component force in the axial direction) based on the oblique planes fails to develop. Therefore, the engagement between the side clutch member and the stationary-shaft side member is released, and the stator side member is eventually permitted to rotate idle relative to the stationary-shaft side member (as the idle mode of the one-way clutch means). Here in the idle mode, the side clutch member and the stator side member rotate unitarily. Therefore, the movement of "getting over the opposite tooth" as in the prior art is not involved, and the shock noise ascribable to the meshing engagement of the teeth is not incurred, either.

Moreover, in engaging or releasing the one-way clutch means, it suffices to merely displace the side clutch member between the stator side member and the stationary-shaft side member in the axial direction to the amount which this side clutch member can come near to or away from the stationary-shaft side member. Therefore, the stroke margin of the side clutch member need not be wide, and the axial dimension (size) of the clutch means is shortened to that extent.

In addition, the one-way clutch mechanism of a torque converter can be so constructed that the first oil chamber is formed between the stationary-shaft side member and the side clutch member, while the second oil chamber is formed between the stator side member and the side clutch member; and that the oil pressure in the vicinity of the hub portion of the stator is introduced into the first oil chamber, while the fluid pressure of the fluid stream acting on the stator is introduced into the second oil chamber. In this case, the side clutch member and the stationary-shaft side member are permitted to come near to or away from each other more easily by utilizing the differential pressure between the oil pressure in the vicinity of the hub portion of the stator and the fluid pressure of the fluid stream. It is accordingly permitted to engage and release the one-way clutch means more reliably.

Besides, the one-way clutch mechanism of a torque converter can also be so constructed that those surfaces of the stator side member and the side clutch member which confront each other are respectively formed with the second oblique planes for bringing the side clutch member and the stationary-shaft side member away from each other, when the stator has received the turning force in the direction reverse to said specified direction from the fluid stream. In this case, especially the stator side member and the stationary-shaft side member are permitted to come away from each other more reliably. It is accordingly permitted to release the one-way clutch means (in other words, to rotate the stator side member idle) more reliably.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 9 is a cross-sectional view correspondent to FIG. 3, showing an example of construction of the one-way clutch of a torque converter in the prior art.

DETAILED DESCRIPTION OF THE PREFERRED EMBODIMENTS

Now, embodiments of the present invention will be described in detail with reference to the drawings.

Figure 1:
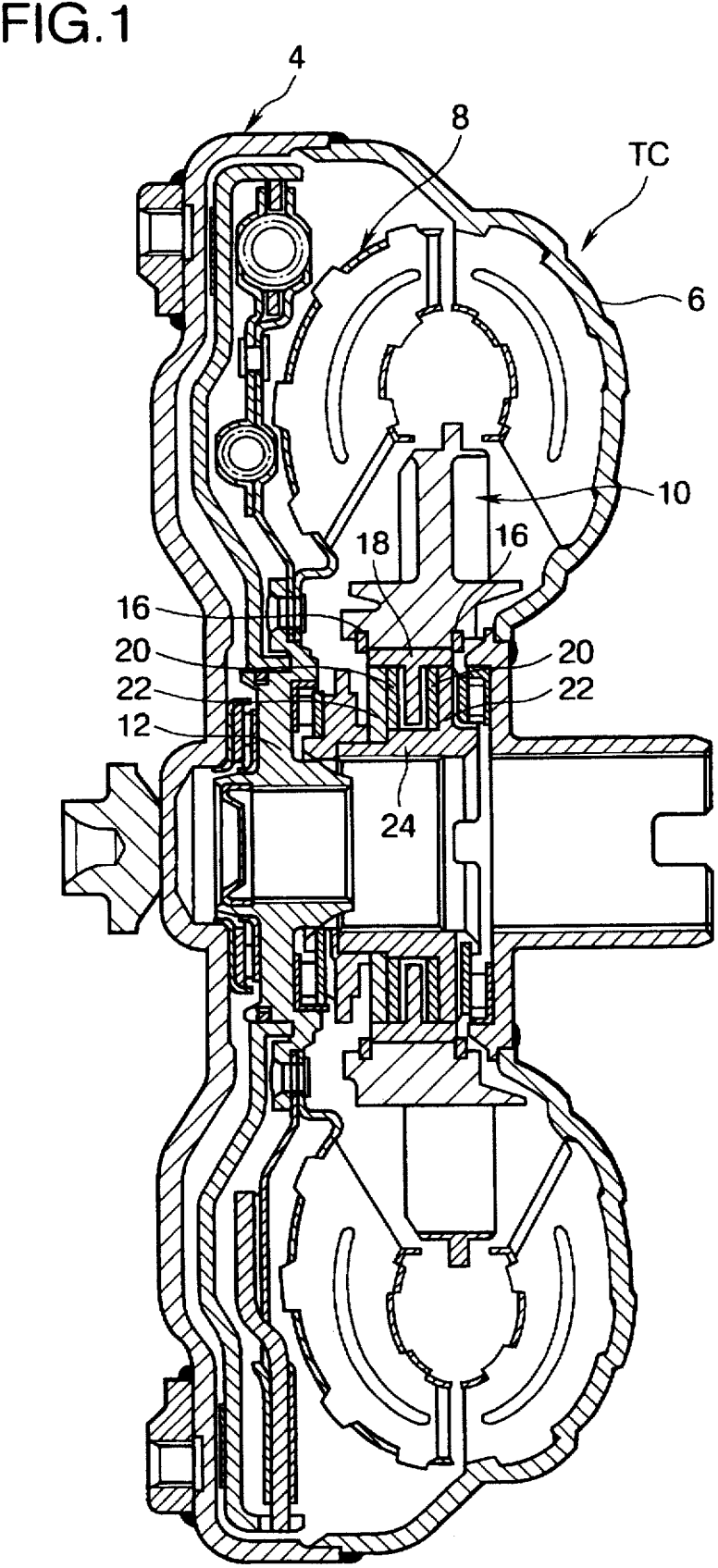
FIG. 1 is a vertical sectional view showing the outline of a torque converter which is equipped with a one-way clutch mechanism according to the first embodiment of the present invention.

FIG. 1 is a vertical sectional view showing the outline of a torque converter TC which is equipped with a one-way clutch mechanism according to the first embodiment of the present invention.

Referring to FIG. 1, a front cover 4 is connected with the output shaft (not shown) of an engine, and a pump 6 is disposed at the rear of the front cover 4 (on the right as seen in the figure). A turbine 8 is interposed between the front cover 4 and the pump 6. The turbine 8 is mounted on the output shaft (not shown) of the torque converter TC through a turbine hub 12.

Besides, a stator 10 for adjusting the stream of a torque converter fluid is interposed between the turbine 8 and the pump 6. A stator side member 18 is attached to the stator 10. The stator side member 18 is united with the stator 10 through two snap rings 16 in the direction of the axis of the torque converter TC and also in the direction of the axis of rotation thereof (in the rotating direction of the stator 10, etc.).

Two side clutch members 20 are disposed on both the sides of the stator side member 18 so as to put this member 18 therebetween. Further, stationary-shaft side members 22 are disposed outside the respective side clutch members 20. The stationary-shaft side members 22 are unitarily fixed to a stationary shaft (not shown) through a stator hub 24.

Figure 2:
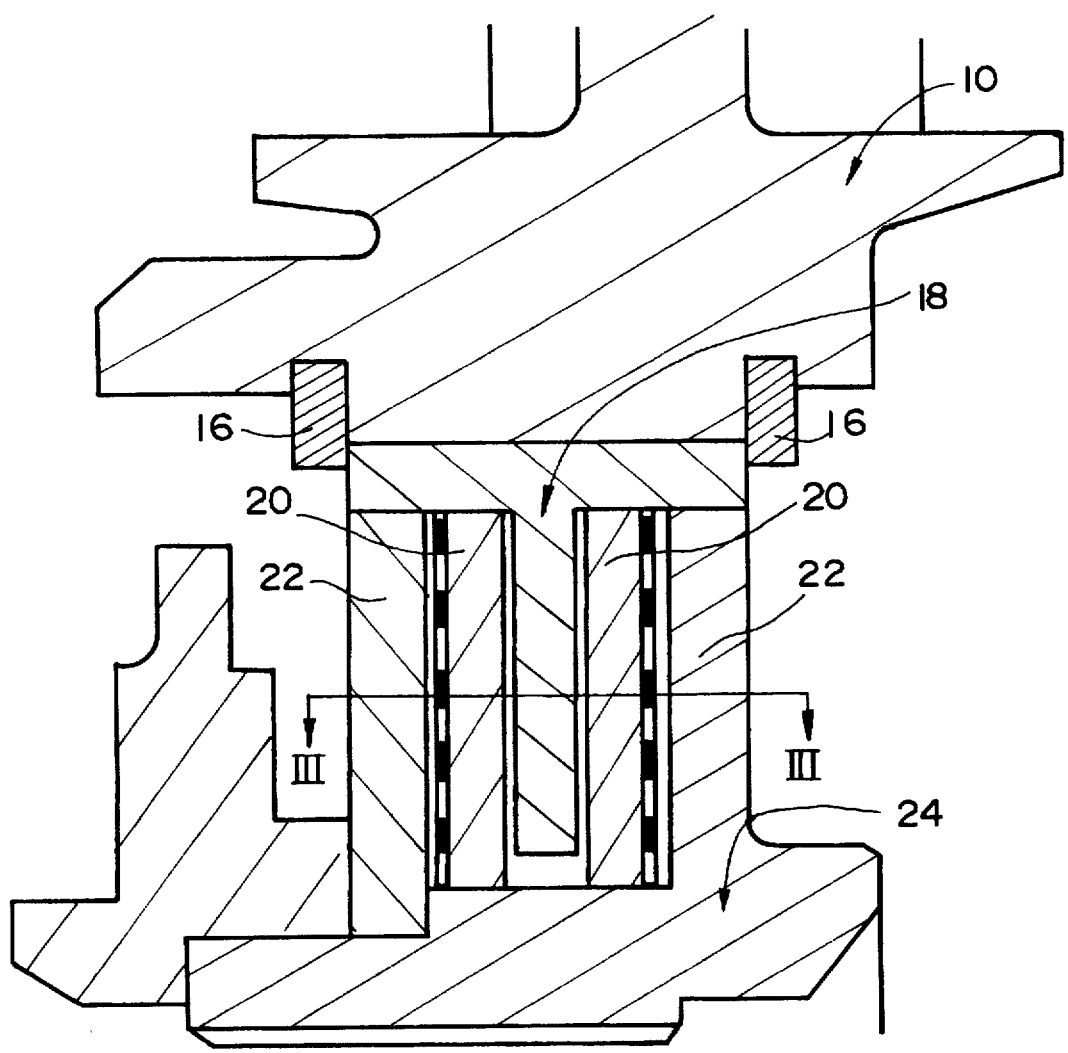
FIG. 2 is an enlarged view of the one-way clutch mechanism depicted in FIG. 1.

The one-way clutch mechanism is chiefly constructed of the stator side member 18, side clutch members 20 and stationary-shaft side members 22 stated above. The enlarged view of the pertinent section is illustrated in FIG. 2. In addition, a cross-sectional view taken along line III—III indicated in FIG. 2 is illustrated in FIG. 3.

Figure 3:
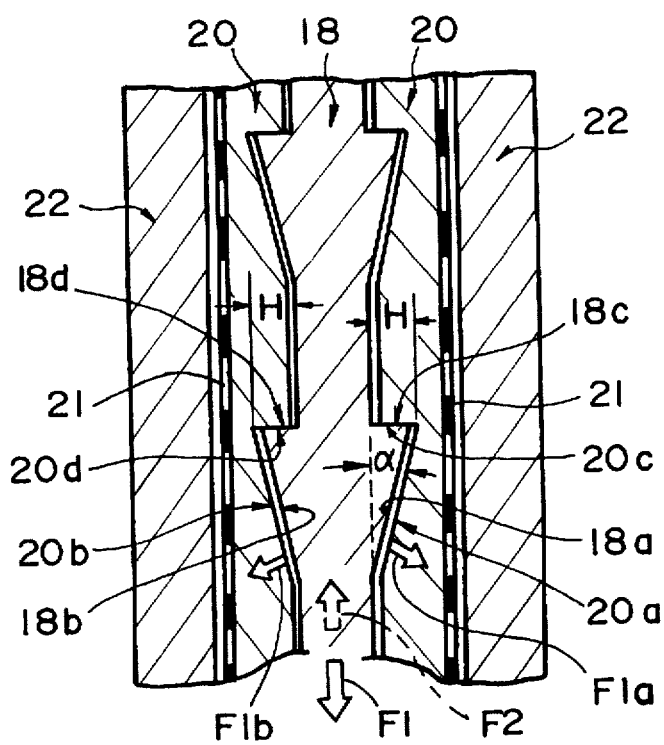
FIG. 3 is a cross-sectional view taken along line III—III indicated in FIG. 2.

As shown in FIG. 3, the stator side member 18 has oblique planes 18a and 18b and right-angled planes 18c and 18d. On the other hand, each of the side clutch members 20 is arranged between the stator side member 18 and the corresponding one of the stationary-shaft side members 22 with slight clearances defined relative to both the members 18 and 22. That side of the side clutch member 20 which confronts the stator side member 18 is formed with an oblique plane 20a (or 20b) and a right-angled plane 20c (or 20d) which correspond to the shapes of the oblique plane 18a (or 18b) and the right-angled plane 18c (or 18d), respectively. Besides, that side of the side clutch member 20 which confronts the stationary-shaft side member 22 is provided with a friction material 21.

The clearance between the stator side member 18 and the side clutch member 20 is smaller than the height H of the right-angled plane 18c (or 18d) even in the state in which this side clutch member 20 lies in touch with the stationary-shaft side member 22. The stator side member 18 and the two side clutch members 20 are therefore adapted to rotate at the same speed in the same direction (in other words, unitarily) at all times.

The operation of the first embodiment will be explained below. When the pump 6 is operated to rotate its impeller by the drive of the engine output shaft, the stream of the torque converter fluid is generated, and the turbine 8 is operated to rotate its runner by receiving the force of the stream. The rotation of the turbine runner is transmitted to the output shaft of the torque converter TC through the turbine hub 12.

The stator 10 adjusts the stream in which the fluid which rotates the turbine runner is returned toward the pump 6. On this occasion, the stator 10 receives a force from the fluid, and the force acts on the stator side member 18 which is unitary with the stator 10.

When the ratio between the rotational speeds of the turbine 8 and the pump 6 is small, the force F1 in a direction indicated in FIG. 3 is exerted on the stator side member 18 by the fluid. The stator 10 (the stator side member 18), however, must not be rotated by the force F1. In this regard, the stator 10 is fixed as stated below.

When the stator side member 18 has undergone the force F1, the oblique planes 18a and 18b thereof push the corresponding oblique planes 20a and 20b of the side clutch members 20, respectively. Thus, the component forces F1a and F1b of the force F1 act on the side clutch members 20 through the oblique planes 20a and 20b, respectively. As a result, the side clutch members 20 are outstretched rightwards and leftwards as viewed in FIG. 3, and the friction material 21 are pressed against the stationary-shaft side members 22 to come into frictional engagement, respectively. When the side clutch members 20 have been brought into frictional engagement with the sides of the stationary-shaft side members 22 (have been fixed on these sides), respectively, the stator side member 18 cannot rotate in the direction of the indicated arrow F1 any more owing to the presence of the oblique planes 18a and 18b and the oblique planes 20a and 20b, either. In consequence, the stator 10 which is unitary with the stator side member 18 is also fixed.

Incidentally, unless the angle α of the oblique plane 18a (or 20a) is preset so as to satisfy tan α<μ (where symbol μ denotes the friction coefficient between the friction material 21 and the stationary-shaft side member 22), the side clutch member 20 cannot be outstretched laterally. The angle α is on the order of several [degrees].

On the other hand, when the ratio between the rotational speeds of the turbine 8 and the pump 6 is large, the stream of the fluid which impinges on the stator 10 changes, and a force F2 which is opposite in direction to the force F1 as shown in FIG. 3 comes to act on the stator side member 18. The stator 10 must be smoothly rotated by receiving the force F2. On this occasion, the stator 10 is rotated as stated below.

When the stator side member 18 has undergone the force F2, the side clutch members 20 come to get on the right-angled planes 18c and 18d of the stator side member 18, and hence, any pressures on the side clutch members 20 (any component forces toward the stationary-shaft side members 22) do not develop, respectively. Accordingly, any pressures are not exerted on the respective stationary-shaft side members 22 through the corresponding side clutch members 20, either. After all, the stator side member 18 and the stator 10 can be easily rotated by the force F2.

By the way, although the friction material 21 is stuck on the side clutch members 20 in this embodiment, it may well be stuck on .the stationary-shaft side members 22. Further, if the friction coefficient between friction surfaces at which each of the side clutch members 20 comes into touch with the corresponding one of the stationary-shaft side members 22 is held appropriate, the friction material 21 may well be omitted.

Next, the second embodiment of the present invention will be described.

The second embodiment consists in that the one-way clutch mechanism of the first embodiment shown in FIGS. 2 and 3 is bettered so as to more reliably bring the side clutch member 20 and the corresponding stationary-shaft side member 22 near to and away from each other.

Figure 4:
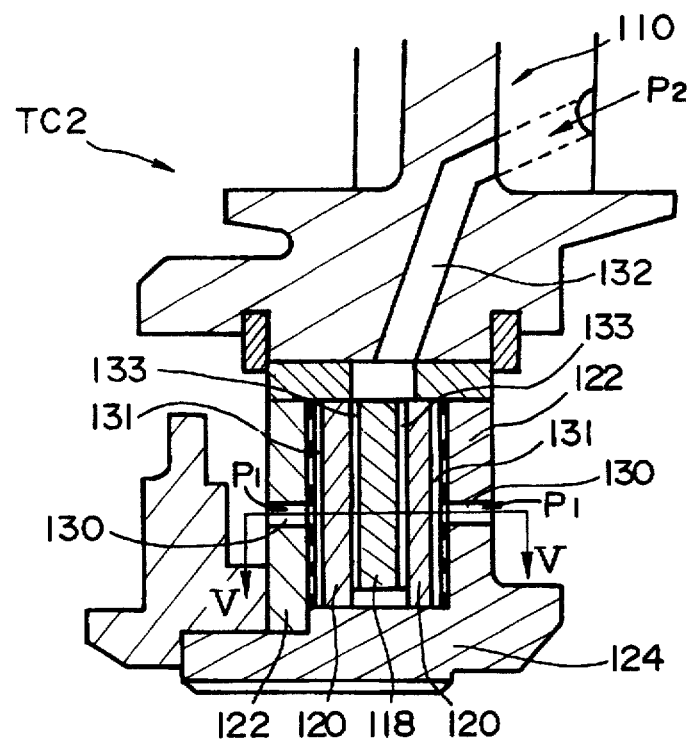
FIG. 4 is a vertical sectional view showing the outline of a one-way clutch mechanism according to the second embodiment.

FIG. 4 is a vertical sectional view schematically showing the one-way clutch mechanism of a torque converter TC2 according to the second embodiment. In addition, FIG. 5 is the enlarged view of a cross section taken along line V—V indicated in FIG. 4.

As shown in FIG. 4, each of stationary-shaft side members 122 is formed with a hole 130. An oil pressure P1 in the vicinity of a stator hub portion 124 is introduced through the hole 130 into a clearance (a first oil chamber) 131 which is defined between the stationary-shaft side member 122 and the corresponding one of side clutch members 120. On the other hand, a stator 110 is formed with a hole or passage 132 which penetrates this stator down to a stator side member 118. A fluid pressure P2 acting on the stator 110 is introduced through the hole 132 into clearances (second oil chambers) 133 each of which is defined between the stator side member 118 and the corresponding side clutch member 120.

Figure 5:
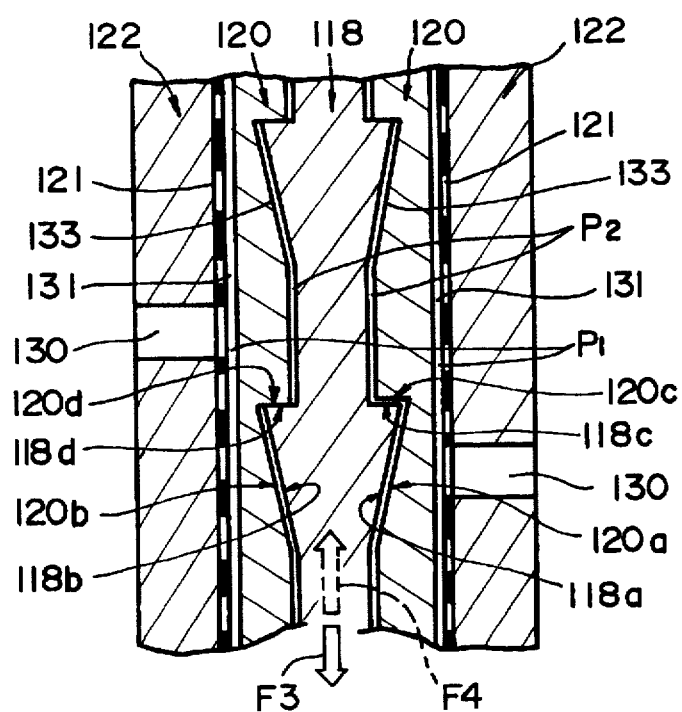
FIG. 5 is a cross-sectional view taken along line V—V indicated in FIG. 4.

As indicated in FIG. 5, a friction material 121 is stuck on the stationary-shaft side member 122, not on the side clutch member 120. Of course, however, the friction material 121 may well be stuck on the side of the side clutch member 120 in the same manner as in the first embodiment.

As already explained, when the ratio between the rotational speeds of a turbine and a pump (not shown) is small, the stator side member 118 undergoes a force F3 in the direction of an arrow shown in FIG. 5, and the oblique planes 118a and 118b thereof outstretch the respectively opposing side clutch members 120 bilaterally. On this occasion, the fluid pressure P2 exerted on the stator 110 and acting within the second oil chambers 133 is higher than the oil pressure P1 in the vicinity of the stator hub portion 124 as acts within the first oil chambers 131 (that is, P2>P1 is held). Therefore, the engaging movement of the one-way clutch of the torque converter TC2 is effected more smoothly and reliably by the resulting differential pressure (P2–P1).

On the other hand, when the speed ratio is large, a force F4 which is opposite in direction to the force F3 as shown in FIG. 5 acts on the stator side member 118, and the oil pressure P1 in the vicinity of the stator hub portion 124 becomes higher than the fluid pressure P2 exerted on the stator 110 (that is, P2<P1 is held). Accordingly, the resulting differential pressure (P1–P2) acts on the side clutch members 120, and the releasing movement of the clutch (the idle rotation of the stator side member 118 unitary with the side clutch members 120) is effected more smoothly and reliably.

Incidentally, since the remaining construction and operation of this embodiment are similar to those of the foregoing first embodiment, merely numerals each having the same two lower digits shall be assigned to identical or similar parts in FIGS. 4 and 5, without the repeated explanation of the parts.

Next, the third embodiment of the present invention will be described.

Figure 6:
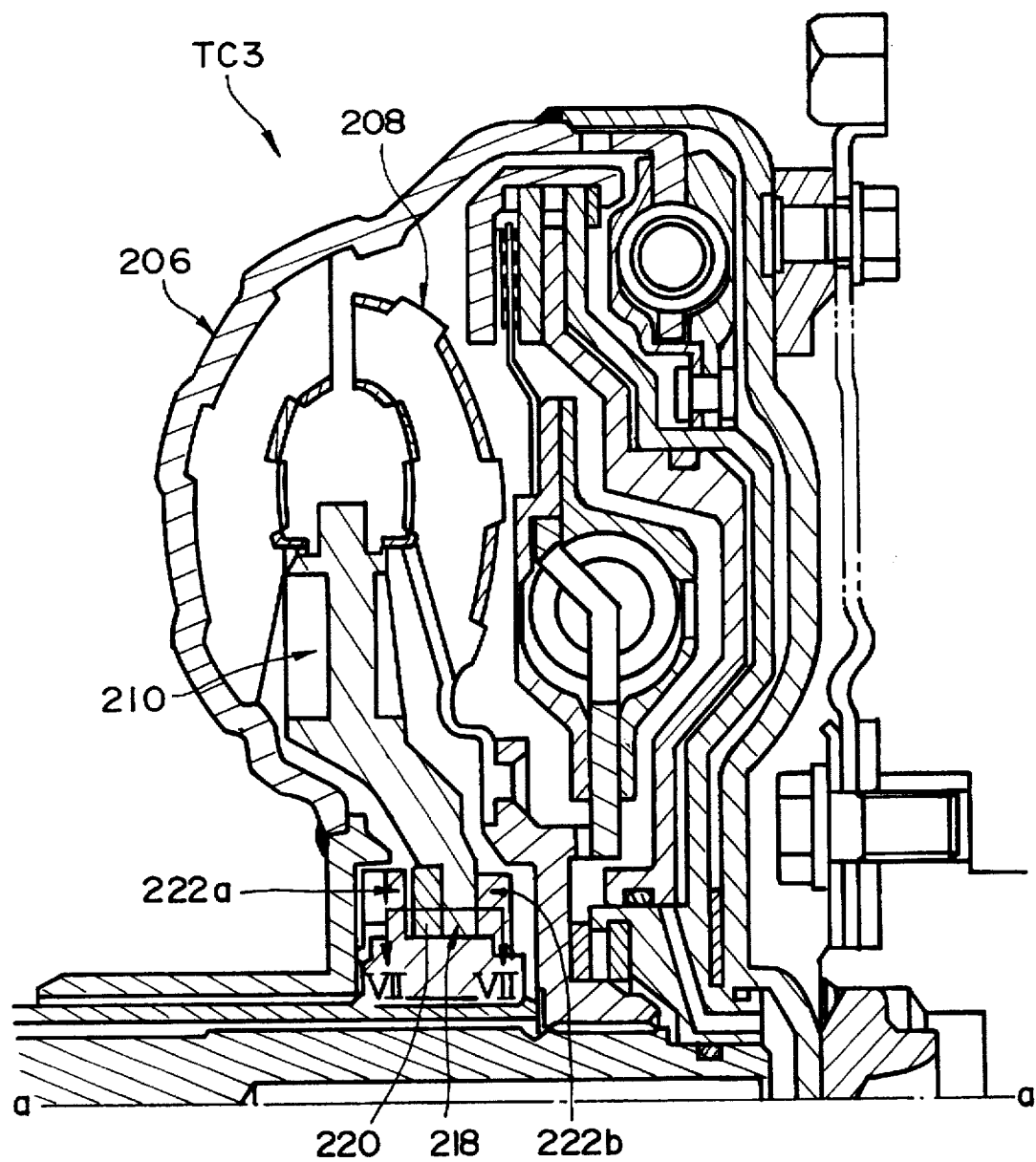
FIG. 6 is a vertical sectional view showing the half of a torque converter above the axis of rotation thereof, the torque converter being equipped with a one-way clutch mechanism according to the third embodiment.

FIG. 6 is a vertical sectional view schematically showing the half of a torque converter TC3 above the axis of rotation thereof, the torque converter being equipped with a one-way clutch mechanism according to the third embodiment. Referring to FIG. 6, line a—a indicates the above axis of rotation. Numeral 206 designates a pump, numeral 208 a turbine, and numeral 210 a stator. Likewise to that of each embodiment described before, the one-way clutch mechanism is chiefly constructed of a stator side member 218, a side clutch member 220, and stationary-shaft side members 222a and 222b. Besides, FIG. 7 is a cross-sectional view taken along line VII—VII indicated in FIG. 6.

Figure 7:
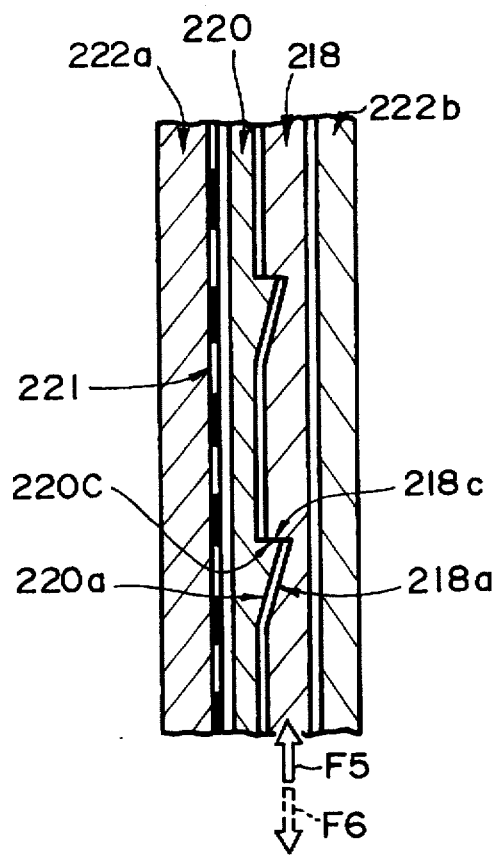
FIG. 7 is a cross-sectional view taken along line VII—VII indicated in FIG. 6.

As shown in FIG. 7, according to the third embodiment, the side clutch member 220 is disposed on only one side of the stator side member 218. A friction material 221 is also stuck on only the stationary-shaft side member 222a on a side which confronts the side clutch member 220. Therefore, the axial dimension of the one-way clutch mechanism is still shorter.

Oblique planes 218a and right-angled planes 218c similar to those of the first embodiment are formed on that side of the stator side member 218 which confronts the side clutch member 220. Also, oblique planes 220a and right-angled planes 220c corresponding to the respective planes 218a and 218c are formed on the confronting side of the side clutch member 220.

In a case where the ratio between the rotational speeds of the turbine 208 and the pump 206 is small, a force F5 in the direction of an arrow shown in FIG. 7 is exerted on the stator side member 218 by the fluid in the torque converter TC3. As a result, the oblique planes 218a push the side clutch member 220 leftwards as seen in FIG. 7, until the side clutch member 220 is pressed against the friction material 221 of the stationary-shaft side member 222a.

Meantime, the stator side member 218 is brought near to the stationary-shaft side member 222b by the resulting reaction force. In this way, frictional engagement is finally effected on the surfaces of both the stationary-shaft side members 222a and 222b.

On the other hand, in a case where the speed ratio is large, a force F6 from the fluid acts in a direction opposite to that of the force F5 as shown in FIG. 7, and the side clutch member 220 comes to get on the right-angled planes 218c of the stator side member 218. As a result, the pressures of the side clutch member 220 and stator side member 218 do not act on the respective stationary-shaft side members 222a and 222b any longer. Accordingly, the clutch of the torque converter TC3 is released (the stator side member 218 unitary with the side clutch member 220 is rotated idle).

Next, the fourth embodiment of the present invention will be described.

Figure 8:
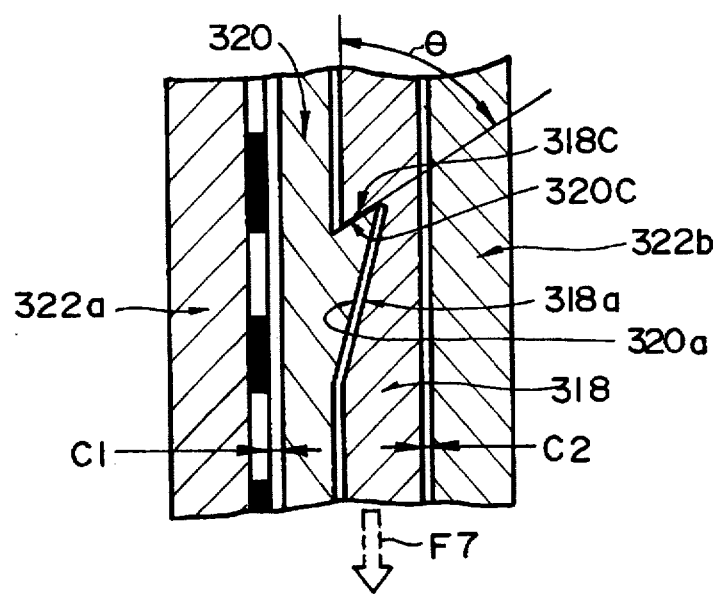
FIG. 8 is a cross-sectional view similar to FIG. 7, showing a one-way clutch mechanism according to the fourth embodiment.

As shown in FIG. 8, the fourth embodiment consists in that the right-angled plane 218c of the stator side member 218 in the preceding third embodiment is altered into a second oblique or inclined plane 318c which has a taper angle θ less than 90°. Also, a second oblique plane 320c corresponding to the oblique plane 318c is formed on that side of a side clutch member 320 which confronts a stator side member 318.

When a force F7 indicated by an arrow in the figure acts on the occasion of the large speed ratio, the side clutch member 320 and the stator side member 318 can be easily brought near to each other by the component forces of the force F7 based on the taper angle θ of the second oblique planes 318c and 320c, and the clutch is released (the stator side member 318 unitary with the side clutch member 320 is rotated idle) smoothly. Accordingly, respective clearances C1 and C2 are reliably secured between a stationary-shaft side member 322a and the side clutch member 320, and between the stator side member 318 and a stationary-shaft side member 322b, and dragging torques can be made substantially null. Incidentally, symbols 318a and 320a in the figure denote first oblique planes, respectively.

By the way, the configuration of the second oblique planes 318c and 320c of the taper angle θ in the fourth embodiment can be directly substituted for the right-angled planes 18c and 20c (or 18d and 20d) in the first embodiment or those 118c and 120c (or 118d and 120d) in the second embodiment, and it can attain a similar function. Besides, the expedient of the second embodiment in which the pressures of the fluid are utilized for assisting the engagement and release of the clutch can be applied to the third or fourth embodiment. Further, the effects of the present invention can be enhanced more by adopting the above contrivances in combination.

As thus far described, according to the present invention, a stroke for releasing the mesh of teeth in the idle rotation of any rotatable member need not be secured, so that the axial dimension of a one-way clutch mechanism can be further shortened. Moreover, the teeth do not come into touch every idle rotation corresponding to one tooth, so that a shock noise is not produced.

What is claimed is:

1. A one-way clutch mechanism of a torque converter having a pump impeller which generates a fluid stream, a turbine runner which is rotated by the fluid stream, a stationary shaft, a stator which is arranged between the pump impeller and the turbine runner so as to receive a turning force from the fluid stream, and one-way clutch means for connecting said stator to said stationary shaft when the stator has received the turning force of specified direction from the fluid stream, comprising:

a stator side member which is disposed unitarily with said stator at an inner circumference thereof;

a stationary-shaft side member which is disposed unitarily with said stationary shaft at an outer circumference thereof so as to confront said stator side member; and a side clutch member which is interposed between said stator side member and said stationary-shaft side member, and which is united with said stator side member in a rotating direction thereof;

wherein those surfaces of said stator side member and said side clutch member which confront each other are respectively formed with oblique planes for bringing said side clutch member away from said stator side member toward said stationary-shaft side member into operational connection between said stator side member and said stationary-shaft side member, only when said stator has received said turning force of the specified direction from said fluid stream.

2. A one-way clutch mechanism of a torque converter as defined in claim 1, wherein:

a first oil chamber is formed between said stationary-shaft side member and said side clutch member, while a second oil chamber is formed between said stator side member and said side clutch member; and an oil pressure in the vicinity of a hub portion of said stator is introduced into said first oil chamber, while a fluid pressure of said fluid stream acting on said stator is introduced into said second oil chamber.

3. A one-way clutch mechanism of a torque converter as defined in claim 1, wherein:

those surfaces of said stator side member and said side clutch member which confront each other are respectively formed with second oblique planes for bringing said side clutch member and said stationary-shaft side member away from each other, when said stator has received the turning force of reverse direction to said specified direction from said fluid stream.

* * * * *